Figure 1:
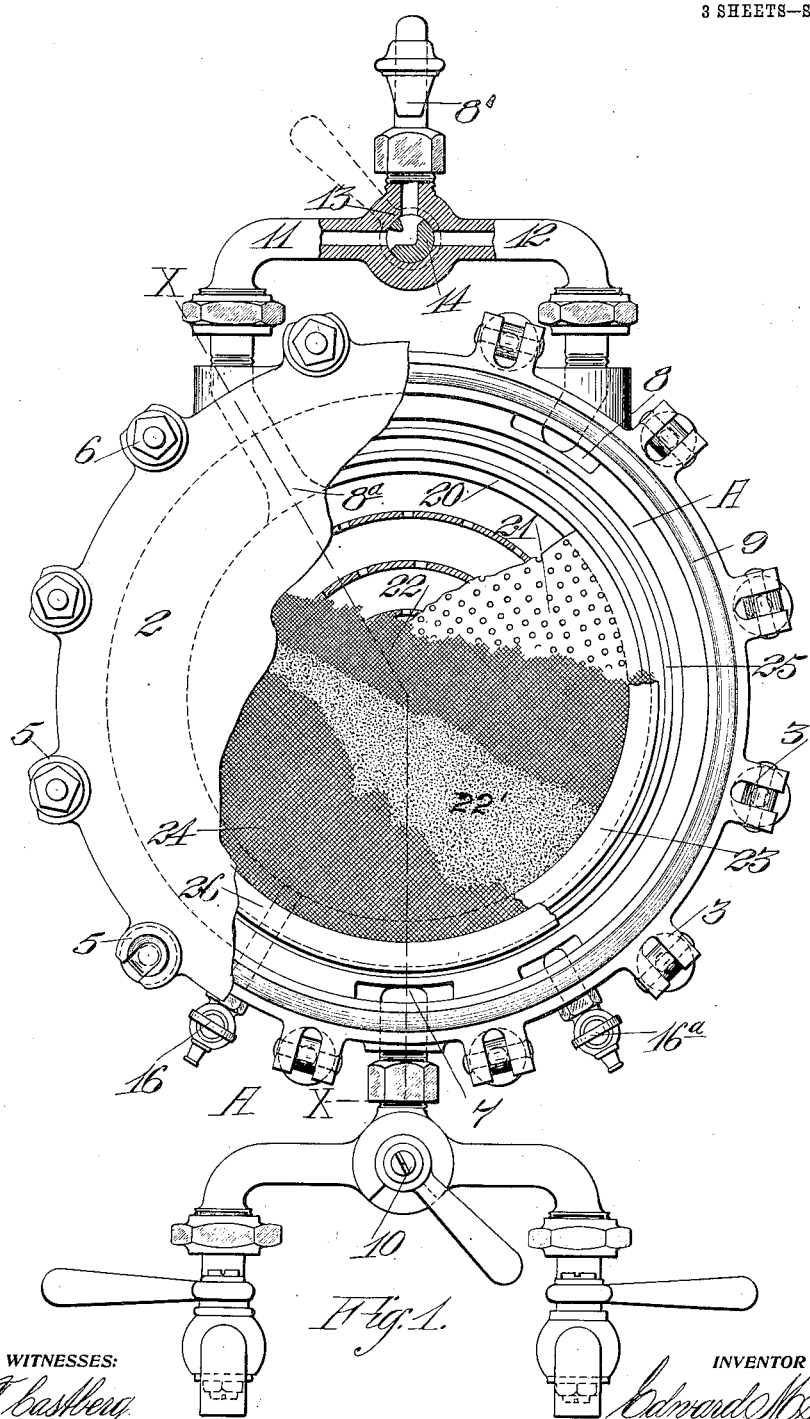

No. 890,989. PATENTED JUNE 16, 1908.
E. M. KNIGHT.
FILTER.
APPLICATION FILED JAN. 21, 1908.

3 SHEETS—SHEET 1.

WITNESSES:

INVENTOR
Edward M. Knight.
BY
Geo. H. Strong
ATTORNEY

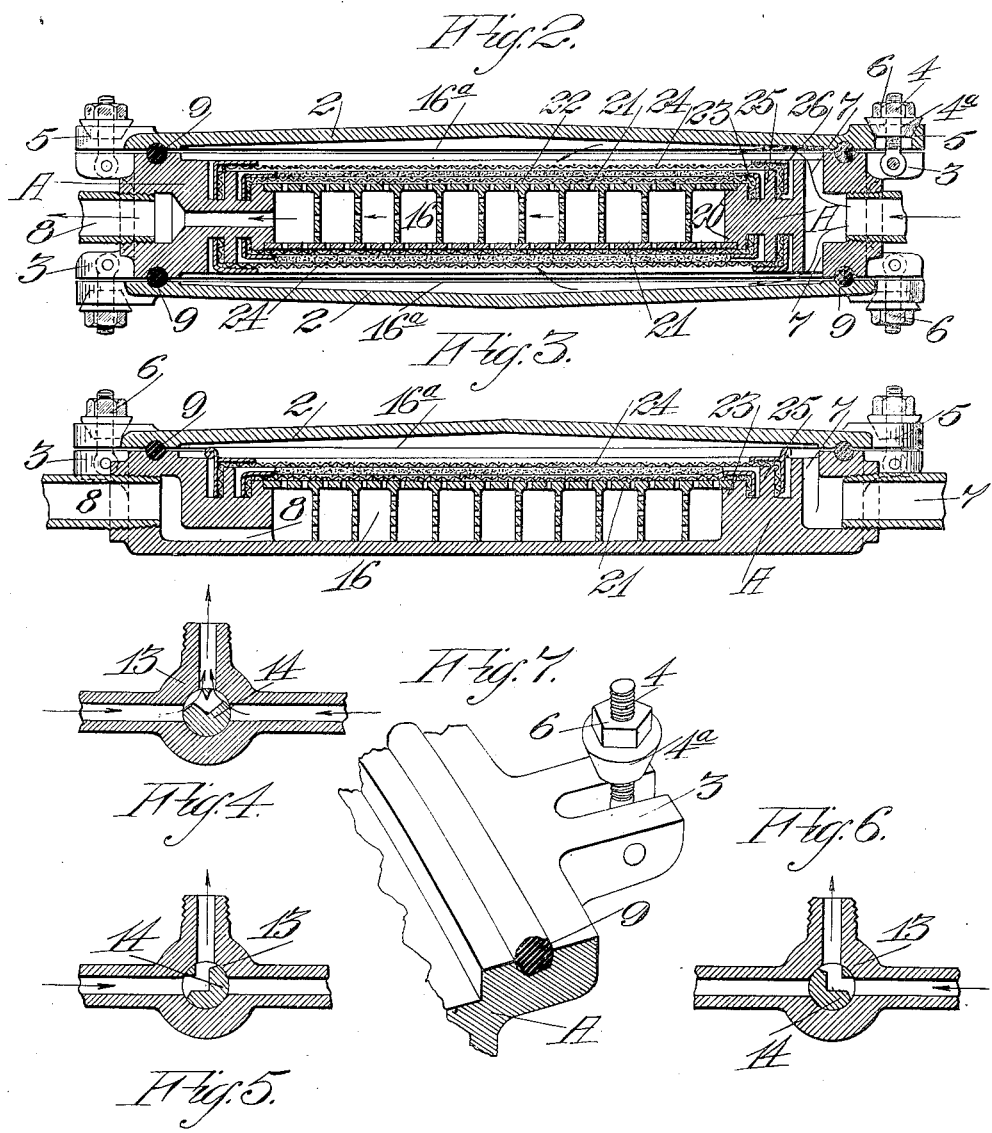

No. 890,989.
E. M. KNIGHT.
FILTER.
APPLICATION FILED JAN. 21, 1908.
PATENTED JUNE 16, 1908.
3 SHEETS—SHEET 3.
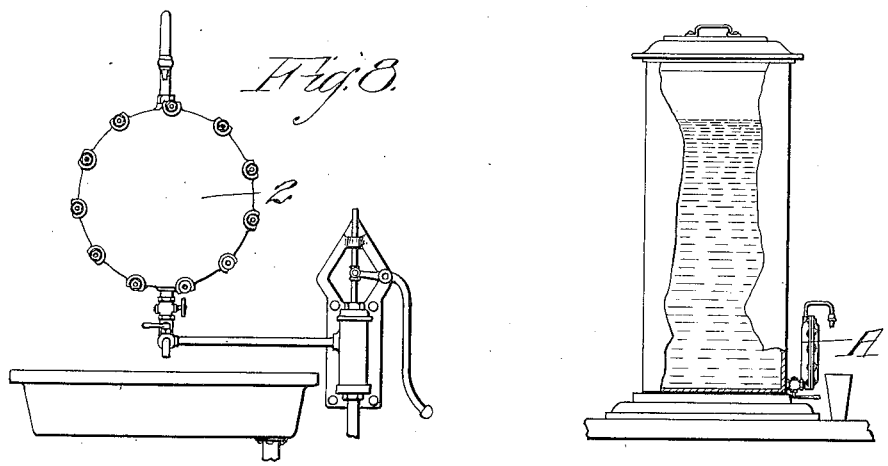
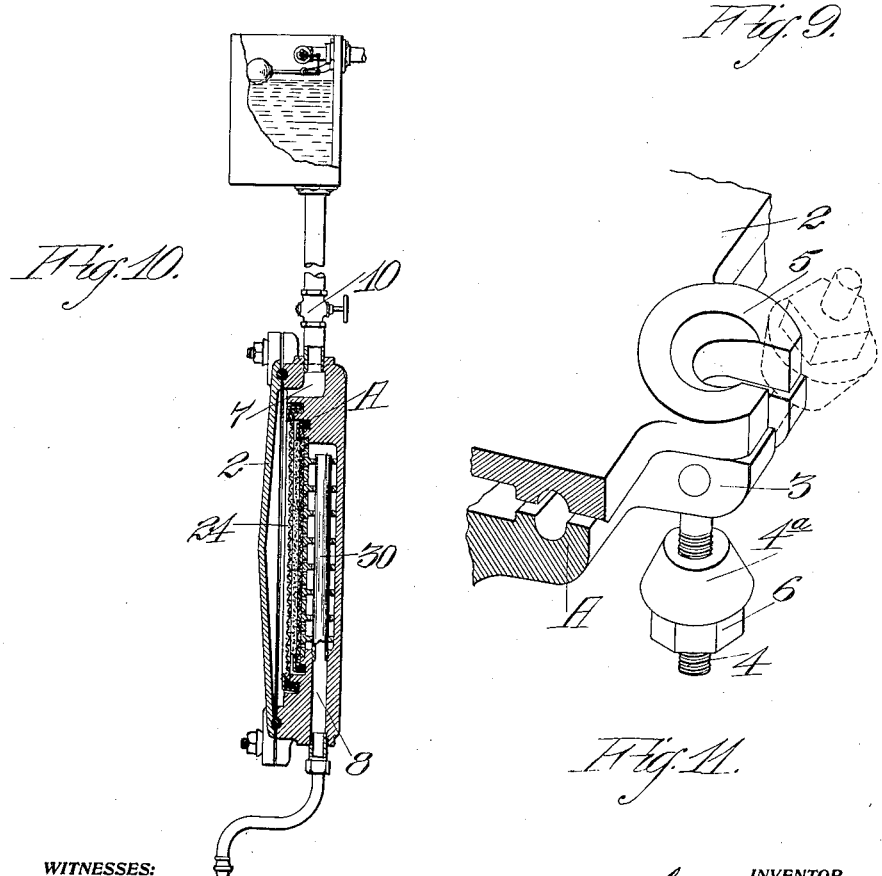

UNITED STATES PATENT OFFICE.

EDWARD M. KNIGHT, OF SAN FRANCISCO, CALIFORNIA.

FILTER.

No. 890,989.  Specification of Letters Patent.  Patented June 16, 1908.

Application filed January 21, 1908. Serial No. 411,926.

*To all whom it may concern:*

Be it known that I, EDWARD M. KNIGHT, citizen of the United States, residing in the city and county of San Francisco and State of California, have invented new and useful Improvements in Filters, of which the following is a specification.

My invention relates primarily to that class of filters employing either a fibrous material as a filtering medium, as a support for a filtering medium, or media of a solidified and porous character may be used in connection with it.

It consists of a rigid frame or casing with removable water-tight cover or covers, means for admitting and withdrawing a liquid; means for securing the purifying medium within the frame, and in combinations of parts, and details of construction which will be more fully explained by reference to the accompanying drawings, in which—

Figure 1 is a front elevation and partial section of my apparatus. Fig. 2 is a section on line $x$—$x$ of Fig. 1. Fig. 3 is a similar section of a filter closed on one side. Figs. 4, 5 and 6 show different positions of the outlet valve. Fig. 7 is a perspective view of part of the rim, lug, locking bolt, and nut with its conical extension. Fig. 8 shows the device connected with a pump. Fig. 9 shows it connected with an adjacent vessel, with top discharge from the filter. Fig. 10 shows the connection with a tank above, with top inlet and bottom discharge through standpipe. Fig. 11 is a perspective view of a portion of the body and cover, with slotted lug showing its countersunk depression, locking bolt, and nut with its conical extension.

The object of my present invention is to improve the construction and thereby increase the efficiency of such apparatus, by constructing a filter embodying and combining advantages characteristic of filters of low pressure or gravity type with advantages distinctive of filters of high pressure type, so that it will possess adaptability to work accurately under either system, gravity or pressure.

In former patents issued to me I have shown various forms of filter frames or holders for employing a fibrous material; said holders or frames differing in construction, but all being alike in that their immersion in a separate tank containing the liquid to b filtered or purified, was necessary to enable them to filter. My present invention is designed to obviate the necessity of having to immerse the frame holding the filtering medium in the liquid to be filtered, and instead, I have shown means for introducing the liquid to be filtered directly into the frame holding or containing the filtering medium; thus I am enabled to dispense with the containing tank for the unfiltered liquid, though still retaining its advantages, for by this construction (as described herein) I am still enabled (though dispensing with the separate tank) to maintain a large superficial area of filtering or purifying surface in a small area, and to employ purifying media of exceeding fineness and lightness of weight, and to hold such filtering media in position without injury to its delicate construction or composition or without disturbing any coating which may be spread or deposited upon the surface of the fibrous material to act as a purifying media, such as fine carbon in the form of paste, constituting an ooze bed of an exceedingly delicate nature. The filtering media used, whatever its character, can be easily inserted, or removed. The filter can be operated by pressure or gravity. In the former case it is either attached to the ordinary service pipe (see Fig. 1) or subject to pressure from a pump (see Fig. 8) ordinary regulating or check valves adjusting the pressure.

Working by gravity the filter is supplied from an adjacent tank containing the liquid to be filtered, Fig. 9, or tank placed above it and connected to it by a pipe, the pressure upon the filter being regulated by the height the tank is placed above the filter. This tank can be filled by hand or attached to the ordinary service pipe and controlled by an automatic ball valve. (Fig. 10).

The frame A of my device may be made of any suitable shape or material. In the present case I have illustrated it in the form of a circular metal frame of considerable diameter having caps or covers 2. These caps or covers are removably fixed to the body in any suitable or desired manner.

In the present case I have shown the body having the lugs 3 upon the periphery, and bolts 4 Figs. 2, 7 and 11, have their inner ends pivoted to swing radially in these lugs.

The covers or caps 2 have similarly slotted lugs 5 in the form of segments, open at their outer edges, so that the bolts swinging upon their pivots, may be turned so as to lie within the lugs 5 of the covers. These lugs are countersunk, as shown.

The bolts have their ends screw-threaded so that the bolts being swung into place, and the ends lying within the slots of the lugs 5, nuts 6 may be screwed upon the ends of the bolts until the parts are drawn snugly together.

In order to insure the parts fitting and remaining in their proper position, I have shown the nuts having their inner ends made conical, as at 4$^a$, and these conical inner ends fit into the countersunk sockets of the lugs 5, and insure the maintenance of the parts in their relative locking position. In order to conveniently turn these nuts and to prevent them being tampered with by the use of an ordinary wrench, I prefer to make the heads of the nuts pentagonal, and to use a socket key of the same shape to turn them.

Around the periphery of the body and coincident therewith, in the cover or covers, are grooves or channels adapted to receive a packing gasket, as at 9, so that the device is hermetically sealed when the parts are in place and lock nuts screwed down.

The fibrous material, such as asbestos cloth, or other similar material, is fixed within the frame or case as follows: Surrounding the central portion of the body is an annular flange 20, and within this flange is fitted a disk of perforated material 21, which forms a support for the fibrous material 22. This fibrous material is, as before stated, of woven asbestos, or other suitable textile. A sheet of this woven material being laid upon the perforated screen 21, its periphery extending over the rigid ring or flange 20, a loose flanged ring 23 is passed over the woven material, and pressed down so that the periphery of the woven material will be clamped between this loose ring 23 and the rigid ring 20. It will thus be stretched smoothly and closely over the screen 21. It may be coated with pulverized carbon; covered with compressed material of a fibrous nature, or a filtering medium of solidified and porous character may be used; the thickness or density of the filtering media used being regulated according to the pressure the filter is required to work under, and the nature of the impurity to be removed. A second sheet of woven or fibrous material 24, to protect the carbon or other filtering media used, is then placed over the first sheet of woven or fibrous material 22, its periphery extending over the rigid flange or ring 25. The loose flanged ring 26 is then passed over the periphery of this second or exterior sheet of woven or fibrous material and pressed down so that the periphery of this second sheet of woven or fibrous material 24 is clamped between the loose ring 26 and the rigid ring 25. Thus both the sheets of fibrous material 22 and 24 and the intervening filtering medium 22' are held firmly in place and prevented from being disturbed by any flow of liquid over or through them.

This apparatus may be made with the body closed upon one side, and a removable cap or cover upon the other, the inlet and outlet passages being so disposed upon opposite sides of the body that the water is compelled to pass through the purifying medium before it can escape; or the body may be open on both sides, with filtering media disposed upon each side of the center, and covers upon both sides of the body. In such case the inlet passage extends entirely across, connecting with both sides of the frame. The liquid to be filtered, passing simultaneously through both sides of the filter media, is discharged from the center of the body through the discharge passage, as described.

The liquid to be filtered or purified enters through an inlet passage placed in the body, as at 7, and escapes through an outlet passage placed in the body, as at 8.

The filter can be entirely emptied at any time by means of discharge cocks placed in the body, one connecting with the filtered water chamber, at 16, and the other with the unfiltered water chamber, at 16$^a$. By thus placing the inlets and outlets and the filtering media within the main body, this main body portion remains intact, and continues fixed in place, while the caps or covers may be readily removed for purposes of inspection, cleansing, removal, or renewal of the filtering medium without disturbing the main body of frame A.

A supply of liquid to the filter is preferably cut off by means of a valve 10 situated at the exterior orifice of inlet 7 in the body of filter, Figs. 1, 8 and 10. Thus, when the filter is not in operation, all pressure upon it, and the purifying media within it, is relieved, and any tendency to force impurities through such media is obviated.

When the filter is fitted in a perpendicular position with cut-off valve to inlet at base of filter, and outlet at the top of the filter, as in Figs. 1 and 8, the simple closing of the inlet valve 10 at the base of the filter cuts off the supply to, and consequent pressure on, the filter, and causes the flow of water from the outlet at top of the filter to immediately cease. But when the filter is fitted in a perpendicular position with the inlet 7 and cut-off valve 10 placed at top of filter, (Fig. 10) and the outlet 8 being placed at the bottom and left open, or fitted with the special "non-closing control valve", hereinafter described, it is obvious that when the cut-off valve 10 is closed, the outlet 8 being open, the filtered water in the filter would not stop flowing, but would continue to flow until the filter had emptied itself. Now to prevent this and to enable the inlet valve 10 when it is situated at the top of the filter to cut off the flow at the outlet 8 when it is situated at the bottom of the filter, I fit a stand-pipe 30 into the inner orifice of the outlet 8, in Fig. 10, for filtered water, said pipe reaching across the interior of the frame, until the end of it terminates only slightly below the plane of the inner orifice of inlet 7, Fig. 10, the intervening space between this orifice and the orifice at the end of the tube thus being very slight. The result of this is that the filtered water in the filter will have to rise to the top of this stand-pipe 30 where the only exit for it is situated, to enable it to pass out at outlet 8; and this it can only do when the inlet valve 10 is open, and pressure is allowed to exert itself on the body of water contained in the filter. Thus the closing of the inlet valve 10 cuts off the pressure, which in turn prevents the water rising to the height of the exit in stand-pipe, as it cannot do so without pressure. The result will be that the water cannot escape from outlet 7. Hence the action of this stand-pipe is to cause the opening of inlet valve 10 to simultaneously open inlet 7 and outlet 8, and the closing of valve 10 simultaneously closes inlet 7 and outlet 8.

The pressure within the filter is regulated by means of an ordinary pressure regulating valve, and the filtering medium is increased or decreased in thickness or density to accord with the pressure admitted to the filter.

Various connections may be made to the filter. It may be connected with a cold water supply only, Figs. 8 and 10 and the water passed through the filter with only an outlet for filtered water. It may have two outlets, one for filtered water, and the other for unfiltered water, Fig. 1, in which case the discharge connecting with the filtered water chamber being closed, and the other passage being opened, a strong current and wash of water will pass directly through the unfiltered water chamber, and will wash off the grosser impurities which may have accummulated upon the outer surface of the filter bed, Fig. 1.

The filter can be attached to both the hot and cold water supply, and their respective ingress being controlled by separate valves (or an ordinary 3-way valve, Fig. 1,) by this method of connection hot filtered water as well as cold can be drawn at any time, and the filter sterilized with the hot water whenever desired.

When the filter is fitted with outlets for both filtered and unfiltered water, instead of controlling their respective discharges by separate valves, in which case one would have to be shut off and the other opened, I have shown two discharge pipes 11 and 12 connected with the body, one of which is connected to the outlet 8' so that water may be drawn directly through the body of the device without passing through the filtering medium when it is desired to withdraw a body of water without filtering, or to flush out the filter. The other pipe is connected to the outlet 8ª Fig. 1 so that any water entering this pipe must first pass through the filtering or purifying medium. These pipes 11 and 12 meet in a three-way passage 13, from which the common discharge pipe 8' leads. Within this three-way passage is fitted a plug 14, the passage and plug thus forming the complete three-way cock. The passages through this plug or cock are so formed that when the cock is turned in one position unfiltered water will pass through the cock and out through the discharge pipe; the passage 11 through which the filtered water will pass being closed. When turned to another position, the passage of the unfiltered water in the pipe 12 will be closed, and the passage from the pipe 11 through the cock to the discharge will be opened. Thus either may be opened or closed by turning this single cock.

The diaphragm in the plug between the two passages is so made that while one passage is closed when the other is opened, both of these outlet passages cannot be closed at the same time, water being able to run around this portion of the diaphragm; and this necessitates the closing of the inlet cock 10 when it is desired to shut off the flow of the liquid. This insures protection of the filter against the liquid being admitted and standing under pressure within it.

Having thus described my invention, what I claim and desire to secure by Letters Patent is:—

1. In a filter of the character described the combination of a main frame or body having inlet and outlet openings in the periphery thereof, superposed layers of filtering medium contained within said frame or body, supporting elements of different axial widths and means for securing said medium in position on said elements, said filtering medium dividing the interior of the frame into an interior filtered-water chamber and an outer unfiltered-water chamber, said peripheral inlet connecting with the unfiltered-water chamber and said outlet connecting with the filtered-water chamber, and a cap or cover removably secured to the frame and forming the outer wall of the unfiltered-water chamber.

2. In a filtering and purifying apparatus, a main frame or holder having inlet and outlet passages through the periphery, and an independent detachably fitted cover, a plurality of concentric rigid supporting rings of different axial widths located within the main body, and means for securing to them superposed layers of a filtering and purifying medium to extend across the body between the interior orifices of the inlet and outlet passages; thus forming separate chambers for the filtered and unfiltered water.

3. In an apparatus for purifying and filtering, a main body having a plurality of outwardly projecting flanged rims of different axial widths, detachable covers, and means for locking said covers upon the outward flanges, annular packing between the covers and the body, interior rings and flanges, perforated disks or screens fitting therein, and superposed layers of filtering and purifying media supported upon said disks and rings, whereby said media are independently retained in position, said body having an inlet passage communicating with the chambers exterior to the filtering surfaces, and having a discharge passage connecting with the space between said filtering media, both passages being through the periphery of main body, and means for controlling the supply and discharge of the liquid.

4. A filtering apparatus consisting of a central body portion, an independent removable cover, means for securing superposed layers of filtering and purifying media transversely within said body so as to form chambers upon its opposite sides, an inlet passage connecting with one of said chambers, outlet passages, one connecting with said inlet chamber, and the other with the outlet chamber, and valves whereby the discharge may be directed across the surface of the filtering media to the outlet, or through the filtering media before reaching the outlet.

5. In an apparatus of the character described, a filter-containing body having inlet and outlet passages formed in its periphery, an independent removable cover, filtering or purifying media, and means for securing the same transversely within the body to form chambers upon opposite sides of the purifying media, a valve-controlled inlet passage connecting with the chamber or chambers exterior to the filtering media, outlet passages, one connecting with the exterior chamber or chambers, and the other with the interior chamber, a three-way cock whereby liquid may be discharged with or without filtering, said cock having a plug so constructed that neither discharge passage may be wholly cut off thereby.

6. In an apparatus of the character described, a main body with inlet and outlet passages formed in its periphery, having filtering and purifying media secured transversely therein, and independent removable caps or covers upon opposite sides, an inlet passage connecting with exterior chambers, said inlet passage having hot and cold water connections and a controlling valve or valves, outlet passages connecting respectively with the inner or pure water chamber, and with the outer unfiltered water chambers whereby either hot or cold water may be drawn directly across the face of the filtering media, or passed there-through, a three-way discharge cock or valve in the path of the discharge passages, said cock having a plug arranged for simultaneously opening one of the discharge passages and closing the other, and an intermediate portion of the plug incapable of entirely closing both of the passages.

7. In a filtering apparatus of the character described, a main frame or body, means contained within the main body for securing the filtering and purifying medium in position, said means including fixed and independently movable clamping rings between which the filter sheets are removably secured, said fixed clamping rings being concentrically arranged and having different axial widths.

8. In a filtering apparatus of the character described, a main frame or body having inlet and outlet passages through the periphery, means contained within the main body for securing the filtering and purifying medium in position, said means including a plurality of fixed and independently movable elements between which superposed filter sheets may be independently secured, said fixed elements projecting to different distances from the body portion.

9. In a filtering apparatus of the character described, a frame having a plurality of fixed annular interior rings, said rings being of different axial widths, foraminous disks, and a plurality of filtering sheets supported thereby, a plurality of independent removable clamping rings by which said sheets are separately extended over their fixed rings, a chamber interior to the filter sheets, means by which water may be admitted under gravity to the exterior surfaces of said filtering media, and means connected with the interior chamber for the escape of the filtered water.

10. In a filtering apparatus of the character described, an exterior frame with covers and fixed annular interspaced rings, foraminous disks and a plurality of flexible filter sheets supported upon said rings, independent clamping rings to secure the sheets, filtered and unfiltered water chambers contiguous to the filter sheets, means for admitting water through the top of the frame to pass through the filtering medium into the filtered water chamber, and a stand-pipe within said chamber connecting with an exit passage through the bottom.

11. In a filtering apparatus of the character described, a frame with removable covers, and interior filtering media fixed to form parallel vertically disposed filtered and unfiltered water chambers between which the filtering media stands, a water supply opening at the top, a discharge opening connecting with the bottom of the filtered water chamber, and a pipe extending upward from said opening to near the top of the filtered water chamber.

In testimony whereof I have hereunto set my hand in presence of two subscribing witnesses.

EDWARD M. KNIGHT.

Witnesses:
    GEO. H. STRONG,
    G. H. NOURSE.